(12) United States Patent
Haubursin et al.

(10) Patent No.: US 6,317,847 B1
(45) Date of Patent: Nov. 13, 2001

(54) SOFTWARE READ AND WRITE TRACING USING HARDWARE ELEMENTS

(75) Inventors: Pierre F. Haubursin, Sunnyvale; Ching Yu, Santa Clara; Din-I Tsai, Fremont; David Balmforth, Mountain View, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/144,644

(22) Filed: Aug. 31, 1998

(51) Int. Cl.$^7$ .................................................. G06F 11/00
(52) U.S. Cl. ................................................ 714/45; 712/227
(58) Field of Search ................................. 714/45, 47, 25, 714/26, 27, 28, 30, 31, 32, 35, 39, 43, 34; 712/227, 236

(56) References Cited

U.S. PATENT DOCUMENTS

| | | | |
|---|---|---|---|
| 4,041,460 | * | 8/1977 | Wisdom et al. ..................... 364/900 |
| 4,777,636 | * | 10/1988 | Yamashita et al. ................... 371/43 |
| 5,365,526 | * | 11/1994 | Wa ..................................... 371/16.5 |
| 5,450,439 | * | 9/1995 | Kato et al. ......................... 375/224 |
| 5,490,178 | * | 2/1996 | Blaker et al. ...................... 375/341 |
| 5,802,378 | * | 9/1998 | Arndt et al. ....................... 395/740 |
| 5,878,208 | * | 3/1999 | Levine et al. ................. 395/183.14 |
| 5,943,498 | * | 8/1999 | Yano et al. ........................ 395/704 |
| 5,946,361 | * | 8/1999 | Araki et al. ....................... 375/341 |
| 5,978,902 | * | 11/1999 | Mann ................................. 712/227 |
| 6,041,406 | * | 3/2000 | Mann ................................. 712/227 |
| 6,094,729 | * | 7/2000 | Mann ................................... 714/25 |
| 6,154,856 | * | 11/2000 | Madduri et al. ..................... 714/27 |
| 6,175,914 | * | 1/2001 | Mann ................................. 712/227 |

* cited by examiner

*Primary Examiner*—Nadeem Iqbal
(74) *Attorney, Agent, or Firm*—McDermott, Will & Emery

(57) ABSTRACT

A system for tracing read and write accesses to selected registers is provided in a network interface. The system has a read trace register containing a separate bit for each register to be monitored for read access by an external CPU. A write trace register is provided with a bit for each register to be monitored for write access by the CPU. When the CPU performs read or write access to a monitored register, a decoder that decodes an address signal from the CPU produces a trace select signal supplied to the read trace register and/or write trace register. In response to the trace select signal, the bit representing the monitored register is set to a predetermined logic state indicating that the monitored register was accessed by the CPU for reading and/or writing.

16 Claims, 3 Drawing Sheets

SOFTWARE READ AND WRITE TRACING USING HARDWARE ELEMENTS

FIELD OF THE INVENTION

The present invention relates to data communications, and more specifically, to a system that enables a user to trace read and write accesses to registers in a data communication device.

BACKGROUND ART

The growth in computer applications that require heavy data traffic and the increasing availability of high-speed transmission lines and intelligent communication switches create a need for data communication networks able to manage a huge amount of data at high rates. Complex software that addresses high-performance requirements of data networks is used to manage communications between a CPU and network devices.

To perform effective diagnostics of a network device, it is necessary to obtain a clear picture of interactions between a CPU and various elements of the network device. Therefore, it would be desirable to provide a system that enables a user to monitor CPU's access to various registers of a network device. To reduce CPU and system bus utilization, it would be desirable to monitor CPU's access using hardware resources of a network device.

DISCLOSURE OF THE INVENTION

Accordingly, an advantage of the present invention is in providing a system that enables a user to monitor host's access to various registers of a communication device.

Another advantage of the present invention is in providing a system that monitors access to registers in a communication device using hardware resources of the device.

These and other advantages of the invention are achieved at least in part by providing an access tracing system that comprises a trace register circuit having bits representing pre-selected registers. A decoder decodes an address signal from a host to supply the trace register circuit with a trace select signal indicating a register being accessed by the host, to assert a bit representing that register.

In accordance with one aspect of the invention, the decoder may also produce a register select signal for allowing the host to access the register.

In accordance with another aspect of the invention, the trace register circuit may comprise a read trace register for storing bits representing registers monitored for read access. The read trace register asserts a bit representing a selected register when the host performs read access to the selected register.

In accordance with a further aspect of the invention, the trace register circuit may also comprise a write trace register for storing bits representing registers monitored for write access. The write trace register asserts a bit representing a selected register when the host performs write access to the selected register.

In accordance with another aspect of the invention, a data communication system controlled by an external host and having data registers accessible by the host via a PCI bus may comprise read and write trace registers for storing bits identifying the data registers and a decoder responsive to an address signal from the host for controlling the read and write trace registers to assert a bit representing a register being accessed by the host.

The decoder may produce a trace select signal when the host performs read access to a monitored data register represented in the read trace register. In response to the trace select signal, the read trace register asserts a bit representing the monitored data register.

Further, the decoder may produce the trace select signal when the host performs write access to a monitored data register represented in the write trace register. In response to the trace select signal, the write trace register asserts a bit representing the monitored register.

In accordance with the method of the present invention, the following steps are carried out for tracing access to selected registers in a data processing device:

decoding address signals from a host to produce a trace select signal for a selected register to be accessed by the host, and asserting a bit representing the selected register in a trace register circuit in response to the trace select signal.

The trace select signal initiates the assertion of a read trace bit in the trace register circuit when the host performs read access to the selected register. Also, the trace select signal initiates the assertion of a write trace bit in the trace register circuit when the host performs write access to the selected register.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature and not as restrictive.

BEST MODE FOR CARRYING OUT THE INVENTION

Although the invention has general applicability in the field of data processing, the best mode for practicing the invention is based in part on the realization of a network interface in a packet switched network, such as an Ethernet (IEEE 802.3) network.

Figure 1A:
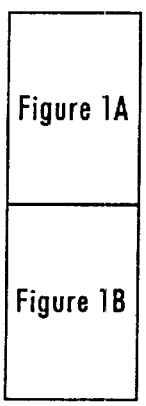
FIG. 1 is a block diagram of an exemplary network interface in which the present invention may be implemented.
Figure 1A:
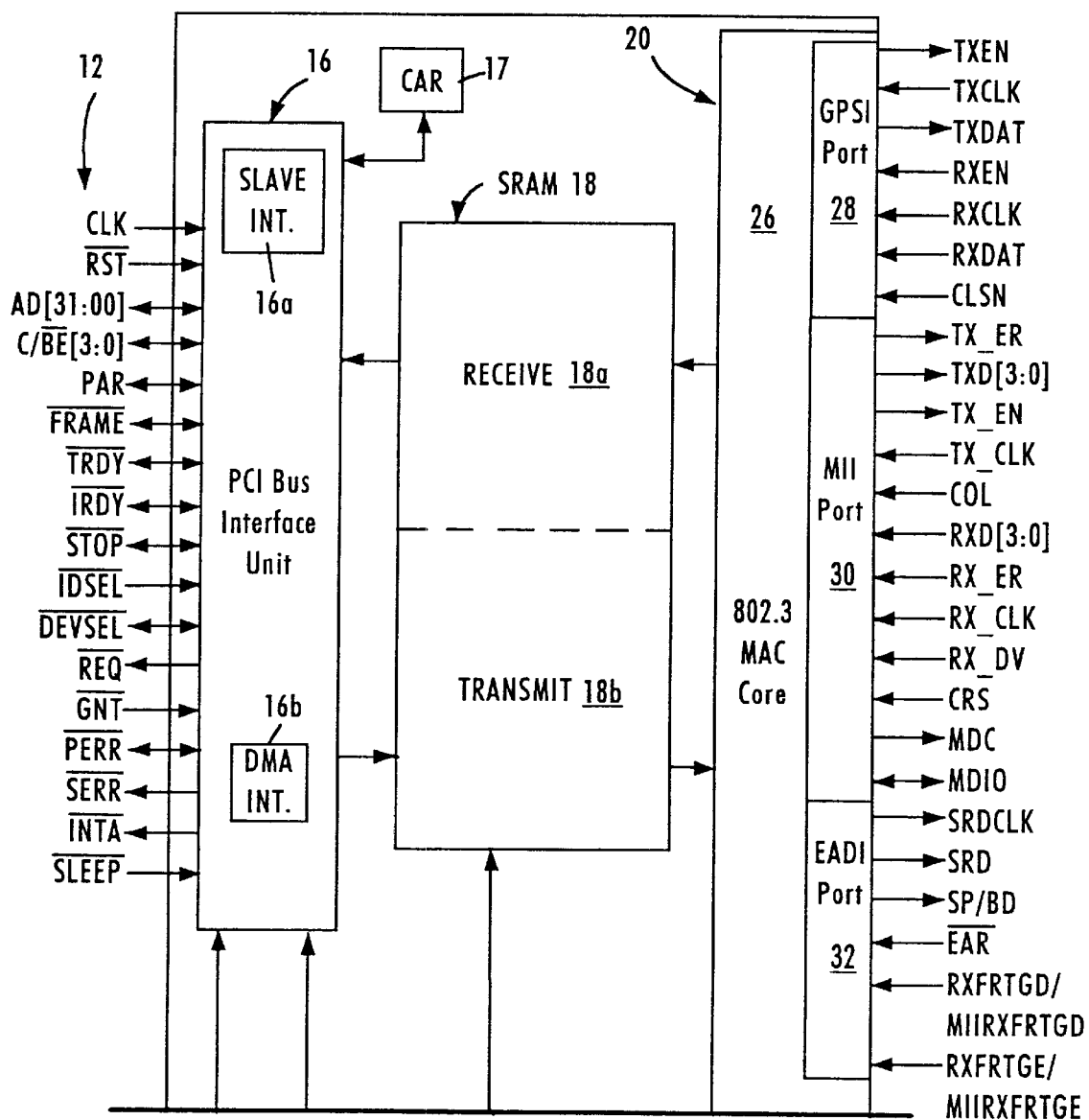
Figure 1B:
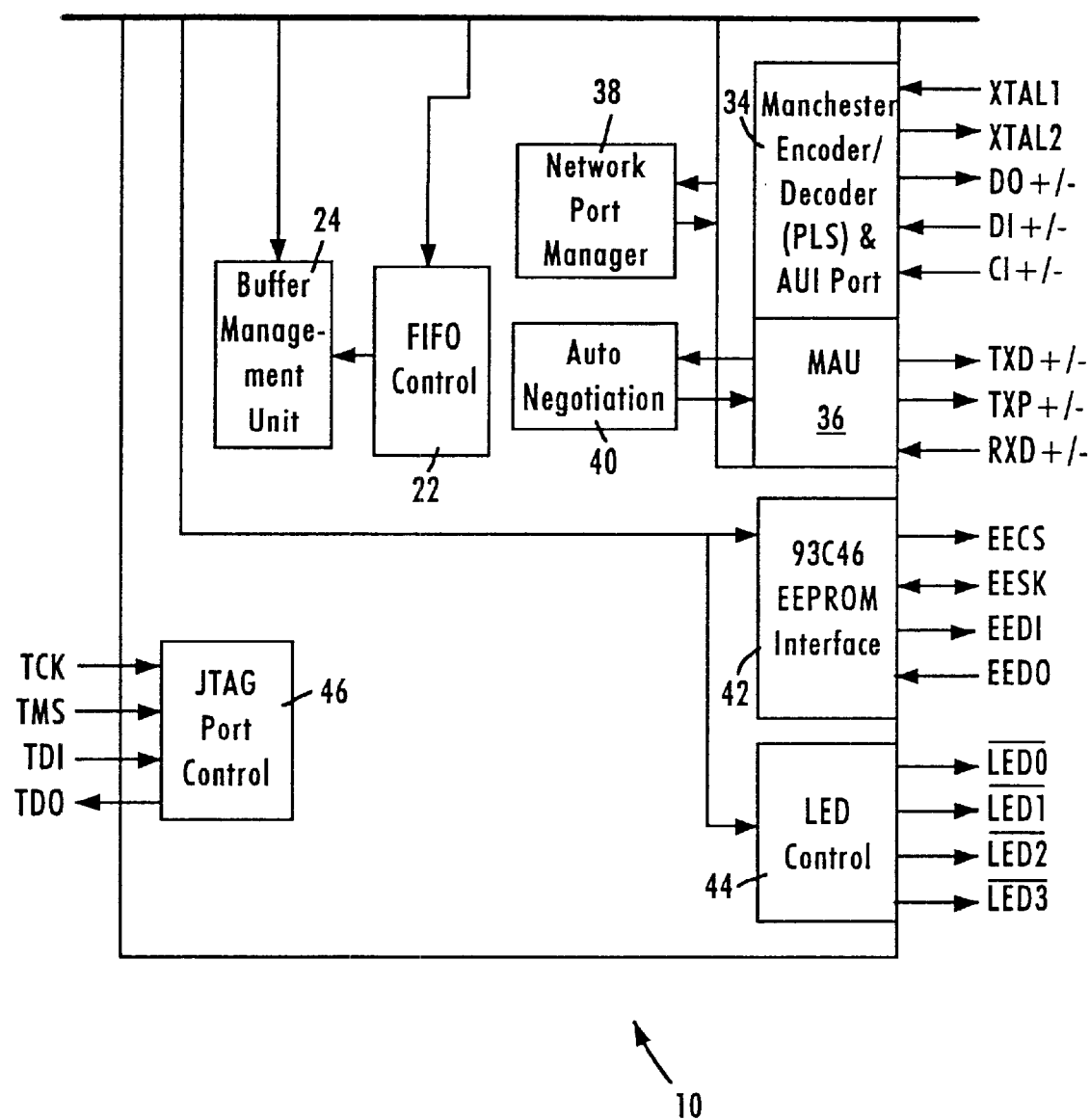

FIG. 1 is a block diagram of an exemplary network interface 10 that accesses the media of an Ethernet (ANSI/IEEE 802.3) network. The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16*a* and a DMA interface 16*b*. The slave interface 16*a* manages PCI control and status information including reading and programming of the PCI status registers and is configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has a 32-bit address/data bus AD[31:0] for providing address and data transfers between the CPU and the network interface 10. An interrupt request output INTA/ is used for supplying the CPU with an interrupt request signal. The network interface 10 produces the interrupt request signal to indicate that one or more of status flags are set. The status flags may represent such events as receive or transmit interrupt, system error, user interrupt, etc.

A control and register (CAR) block 17 is interfaced to the PCI bus interface 16 to allow read and write accesses to various registers in the network interface 10. As discussed in more detail later, the CAR block 17 contains a command register which produces command signals sent to other blocks of the interface 10. Also, the CAR block 17 comprises registers accessible by the host CPU for read and write operations through the PCI bus interface 16.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s and whether the link should be half-duplex or full-duplex.

The EEPROM interface 42 connects to an EEPROM on either a network interface adapter card or the motherboard of the host computer via a serial interface link. The EEPROM (not shown in FIG. 1) may be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

The LED controller 44 selectively controls the generation of LED output signals based upon the internal decoding logic and network interface status registers (not shown).

Figure 2:
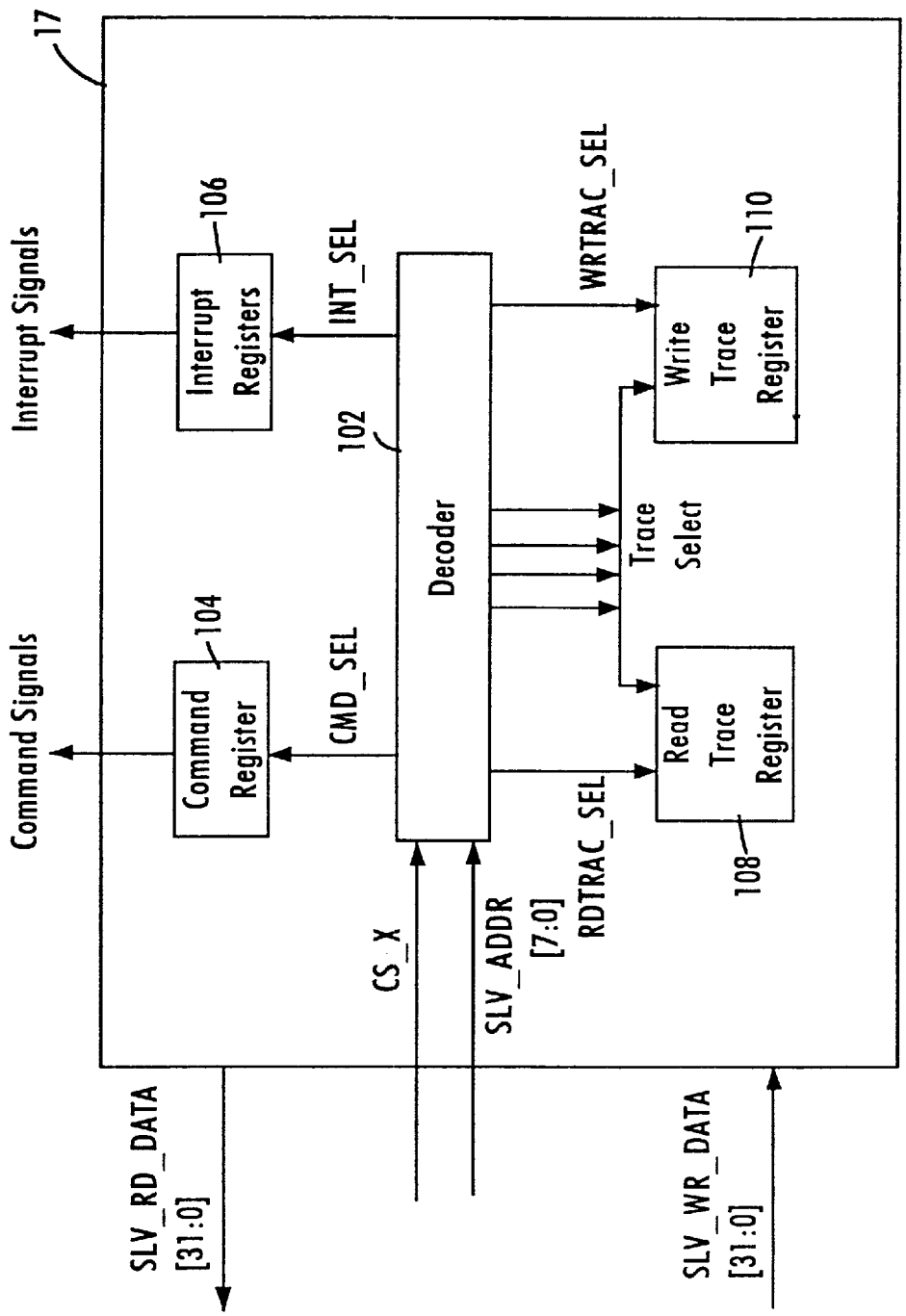
FIG. 2 is a block-diagram illustrating an access tracing system in the network interface.

As discussed above, the control and register (CAR) block 17 manages top-level registers of the network interface 10. The CAR block 17 is coupled to the PCI bus interface unit 16 to allow read and write accesses to the registers via the slave interface 16a. Referring to FIG. 2, the CAR block 17 has a decoder 102 and multiple global registers such as a command register 104, interrupt registers 106, a read trace register 108, a write trace register 110, etc. The decoder 102 decodes the address of the register to be accessed by the CPU via the PCI bus interface unit 16, and provides access to the selected register. The command register 104 contains decode values for each command that may be performed in the network interface 10. For example, the command register 104 may comprise commands instructing the network interface 10 to switch into a particular mode of operation, to start or stop frame transmission or reception, etc. The command signals produced by the command register 104 are supplied to network interface blocks responsible for performing particular commands.

The interrupt registers 106 may comprise interrupt bits corresponding to various transmit and receive interrupt events. Among transmit interrupt events are transmit descriptor interrupts asserted when a transmit descriptor has been processed, free bytes interrupts asserted when a certain number of bytes become free in the transmit buffer 18b, transmit frame complete interrupts indicating that a transmit frame has been either successfully transmitted to the network or aborted due to error conditions, etc. The receive interrupt events include receive frame complete interrupts indicating that an entire receive frame is processed, and the receive out-of-descriptor interrupts asserted when the network adapter wants to transfer receive data to the system memory but no receive descriptor is available, etc. The interrupt bits are sent to the PCI bus interface unit 16 for activating the interrupt request output INTA/.

The read trace register 108 and the write trace register 110 are provided to monitor selected registers of the network interface 10 for read and write accesses, respectively. As discussed in more detail later, the read trace register 108 and the write trace register 110 contain bits identifying the registers to be monitored.

When the CPU performs read access to a selected register via the PCI bus interface unit 16, the bit representing the selected register in the read trace register 108 may be set to logic 1. If the CPU reads the selected register the second time, the bit representing the register remains set to logic 1. The bit is cleared when the CPU writes logic 0 to the corresponding location of the read trace register 108, via the PCI bus interface unit 16.

Similarly, when the CPU writes data to a selected register via the PCI bus interface 16, the bit representing the selected register in the write trace register 110 may be set to logic 1. If the CPU performs write access to the same register the second time, the bit representing the register remains unchanged. The bit is cleared when the CPU writes logic 0 to the corresponding location of the write trace register 110.

Thus, the read trace register 108 and write trace register 110 enables a user to determine whether a particular register of the network interface 10 was accessed for read and/or write operations. This information facilitates debugging of the network interface 10. Further, as network interface hardware elements are used to obtain debugging information, utilization of the CPU and the PCI bus is reduced.

When the CPU performs read or write access to a register of the network interface 10 via the PCI bus 12, the PCI bus interface unit 16 supplies the decoder 102 with a chip select signal CS_X and register address bits SLV_ADDR[7:0]. The chip select signal CS_X identifies a register page to be accessed. For example, the network interface registers may be arranged on 64 pages. The register address bits SLV_ADDR[7:0] identifies a 32-bit register within the selected page.

The decoder 102 decodes the CS_X and SLV_ADDR [7:0] signals to generate a select signal for each of the CAR block registers. For example, a CMD_SEL signal is used for selecting the command register 104, interrupt select signals INT_SEL are produced for selecting the interrupt registers 106, a RDTRAC_SEL signal provides selecting the read trace register 108, and a WRTRAC_SEL signal is used for selecting the write trace register 110. In addition, the decoder 102 produces multiple tracing select signals corresponding to network interface registers that need to be monitored for read and write accesses. A data read bus SLV_RD_DATA[31:0] couples each of the registers to the slave interface 16a for providing the CPU with read access to the registers. A data write bus SLV_WR_DATA[31:0] connects each of the registers to the slave interface 16a for writing data from the CPU to the registers.

When a CAR block register is selected, the decoder 102 generates a CAR ready signal CAR_RDY delayed with respect to the CS_X signal by one clock period. For a read operation, a select signal from the decoder 102 enables the tri-state output buffer of the corresponding selected register. The selected register drives its content onto the data read bus SLV_RD_DATA[31:0]. Once the CAR block 17 produces the CAR_RDY signal, the PCI bus interface unit 16 reads the data from the SLV_RD_DATA[31:0] bus, and transfers the data to the CPU via the PCI bus 12.

For a write operation, the PCI block interface 16 put the data received via the PCI bus 12 from the CPU on the data write bus SLV_WR_DATA[31:0]. A select signal produced by the decoder 102 allows the corresponding selected register to be loaded from the data write bus SLV_WR_DATA[31:0].

The read trace register 108 may be a 32-bit register that contains one bit for each network interface register to be monitored for read access. For example, the read trace register 108 may comprise bits representing each of the interrupt registers 106, and a bit representing a semaphore register used for synchronizing two or more processes that require temporary exclusive access to some shared resource. The semaphore register may be arranged in the CAR block 17.

Also, the read trace register 108 may contain a bit representing a software time register comprising a programmable time value. The network interface generates an interrupt request signal when this programmable time value has elapsed since the previous interrupt event. The software time register may be also arranged in the CAR block 17.

Further, the read trace register 108 may comprise bits corresponding to a transmit descriptor control register, receive frame status registers, MII port registers, etc. These registers may be arranged in various blocks of the network interface 10 outside the CAR block 17.

When the CPU requests read access to a register identified in the read trace register 108, the corresponding chip select signal CS_X and the address bits SLV_ADDR[7:0] are supplied to the decoder 102 to produce a select signal for selecting the register to be accessed. Also, the decoder 102 generates a trace select signal for the selected register. The trace select signal is supplied to the read trace register 108 to set the bit representing the selected register to logic 1. Thus, a user is enabled to determine that the CPU performed read access to the register corresponding to the bit set to logic 1. If the CPU performs multiple read accesses to the selected register, the bit representing the register remains set to logic 1. To clear this bit, the CPU writes logic 0 into the corresponding location of the read trace register 108.

For example, if the CPU performs reading data from the interrupt register 106, the decoder 102 produces an interrupt register select signal INT_SEL to select the interrupt register 106 for reading data. In addition, the decoder 102 generates an interrupt trace select signal supplied to the read trace register 108 to indicate that the interrupt register is selected for reading. The read trace register 108 may contain an interrupt read bit representing the interrupt register 106. In response to the interrupt trace select signal, the interrupt read bit is set to logic 1 to indicate that the interrupt register was accessed for reading data.

The write trace register 110 may be a 32-bit register containing a bit for each register to be monitored for write access. For example, the write trace register 110 may contain a bit representing the command register 104, a bit for each of the interrupt registers 106, a bit representing the semaphore register, bits for MII port registers, etc.

When the CPU requests write access to a register represented in the write trace register 110, the decoder 102 produces a select signal for selecting the register, and a trace select signal corresponding to the selected register. The trace select signal is supplied to the write trace register 110 to set the bit representing the selected register to logic 1. As a result, a user is enabled to determine that the CPU wrote data to the selected register. If the CPU performs multiple write accesses to the selected register, the bit representing that register remains unchanged. The bit may be cleared, when the CPU writes logic 0 into the corresponding location of the write trace register 110.

For example, when the CPU writes data to the command register 104, the decoder 102 produces a command trace select signal supplied to the write trace register 110. A command register write bit may be provided in the write trace register 110 to represent the command register 104. In response to the command trace select signal, the command register write bit is set to logic 1 to indicate that the CPU wrote data to the command register 104.

Thus, the system of the present invention enables a user to monitor registers in the network interface device 10 for read and write accesses by an external CPU, in order to facilitate debugging of the device 10. As the debugging procedure is performed using hardware elements of the device 10, the utilization of the PCI bus 12 and the external CPU is reduced.

There accordingly has been described a system for tracing read and write accesses to selected registers in a network interface including a read trace register and a write trace register. The read trace register contains a separate bit for each register to be monitored for read access by an external CPU, whereas the write trace register has a bit for each register to be monitored for write access by the CPU. When the CPU performs read or write access to a monitored register, a decoder that decodes an address signal from the CPU produces a trace select signal supplied to the read trace register and/or write trace register. In response to the trace select signal, the bit representing the monitored register is set to a predetermined logic state to indicate that the monitored register was accessed by the CPU for reading and/or writing.

In this disclosure, there are shown and described only the preferred embodiments of the invention, but it is to be understood that the invention is capable of changes and modifications within the scope of the inventive concept as expressed herein.

What is claimed is:

1. A system for monitoring access to pre-selected registers in a data processing device, comprising:
    a trace register circuit comprising bits representing said pre-selected registers, and
    a decoder responsive to an address signal from a host for supplying said trace register circuit with a trace select signal indicating a register being accessed by said host, to assert a bit representing said register.

2. The system of claim 1, wherein said decoder is arranged to produce a register select signal for allowing said host to access said register.

3. The system of claim 1, wherein said trace register circuit comprises a read trace register for storing bits representing registers monitored for read access.

4. The system of claim 3, wherein said read trace register is arranged to assert a bit representing a selected register when said host performs read access to said selected register.

5. The system of claim 1, wherein said trace register circuit comprises a write trace register for storing bits representing registers monitored for write access.

6. The system of claim 5, wherein said write trace register is arranged to assert a bit representing a selected register when said host performs write access to said selected register.

7. A data communication system controlled by an external host, comprising:
    data registers for storing information,
    a PCI bus for providing said host with access to said registers,
    a trace register circuit for storing bits identifying said data registers, and
    a decoder responsive to an address signal from said host for controlling said trace register circuit to assert a bit representing a register accessed by said host.

8. The system of claim 7, wherein said trace register circuit comprises a read trace register for storing bits representing the data registers monitored for read access.

9. The system of claim 8, wherein said decoder is adapted to produce a trace select signal when said host performs read access to a monitored data register represented in said read trace register.

10. The system of claim 9, wherein said read trace register is adapted to assert a bit representing said monitored data register in response to said trace select signal.

11. The system of claim 7, wherein said trace register circuit comprises write trace register for storing bits representing the data registers monitored for write access.

12. The system of claim 11, wherein said decoder is adapted to produce a trace select signal when said host performs write access to a monitored data register represented in said write trace register.

13. The system of claim 12, wherein said write trace register is adapted to assert a bit representing said monitored data register in response to said trace select signal.

14. A method of tracing access to selected registers in a data processing device, comprising the steps of:
    decoding address signals from a host to produce a trace select signal for a selected register to be accessed by said host, and
    asserting a bit representing said selected register in a trace register circuit in response to said trace select signal.

15. The method of claim 14, wherein said trace select signal initiates assertion of a read trace bit in said trace register circuit when said host performs read access to said selected register.

16. The method of claim 15, wherein said trace select signal initiates assertion of a write trace bit in said trace register circuit when said host performs write access to said selected register.

* * * * *